United States Patent
Joo et al.

(10) Patent No.: US 10,486,024 B2
(45) Date of Patent: Nov. 26, 2019

(54) SENSING DEVICE AND SENSING METHOD USED IN BASEBALL PRACTICE APPARATUS, BASEBALL PRACTICE APPARATUS USING THE SENSING DEVICE AND THE SENSING METHOD, AND METHOD OF CONTROLLING THE BASEBALL PRACTICE APPARATUS

(71) Applicant: NEWDIN CONTENTS CO., LTD., Seoul (KR)

(72) Inventors: Sang Hyun Joo, Daejeon (KR); Se Hwan Kim, Daegu (KR); Bong Kyung Ko, Daejeon (KR)

(73) Assignee: NEWDIN CONTENTS CO., LTD., Seoul (KR)

( * ) Notice: Subject to any disclaimer, the term of this patent is extended or adjusted under 35 U.S.C. 154(b) by 19 days.

(21) Appl. No.: 16/068,370

(22) PCT Filed: Jan. 16, 2017

(86) PCT No.: PCT/KR2017/000515
§ 371 (c)(1),
(2) Date: Jul. 6, 2018

(87) PCT Pub. No.: WO2017/126850
PCT Pub. Date: Jul. 27, 2017

(65) Prior Publication Data
US 2019/0015699 A1    Jan. 17, 2019

(30) Foreign Application Priority Data

Jan. 22, 2016 (KR) ........................ 10-2016-0007912

(51) Int. Cl.
*A63B 69/00* (2006.01)
*A63B 24/00* (2006.01)
(Continued)

(52) U.S. Cl.
CPC ...... *A63B 24/0021* (2013.01); *A63B 24/0003* (2013.01); *A63B 60/46* (2015.10);
(Continued)

(58) Field of Classification Search
CPC ........ A63B 69/0002; A63B 2069/0008; A63B 24/0021; A63B 2024/0034;
(Continued)

(56) References Cited

U.S. PATENT DOCUMENTS 4,941,662 A * 7/1990 DePerna ................ A63C 19/00
 273/317.6
5,443,260 A * 8/1995 Stewart .............. A63B 69/0002
 473/421

(Continued)

FOREIGN PATENT DOCUMENTS

JP    2014-217468 A    11/2014
KR    20-0269859 Y1    3/2002
(Continued)

OTHER PUBLICATIONS

International Search Report for PCT/KR2017/000515 dated Apr. 18, 2017 from Korean Intellectual Property Office.

*Primary Examiner* — Lawrence S Galka
(74) *Attorney, Agent, or Firm* — Revolution IP, PLLC

(57) ABSTRACT

Disclosed are an image-processing-type sensing device and sensing method that are capable of acquiring an image of the motion of a pitched ball or a hit ball and analyzing the acquired image in order to calculate an accurate and rapid motion model of the ball, which shows how the ball moves, in a baseball practice apparatus that allows a user to perform a baseball practice or to play a baseball game, whereby it is possible to very accurately and rapidly calculate various kinds of information necessary for conducting the baseball practice or the baseball game, such as motion parameters of (Continued)

the pitched ball or the hit ball, a baseball practice apparatus using the sensing device and the sensing method, and a method of controlling the baseball practice apparatus.

6 Claims, 9 Drawing Sheets

(51) Int. Cl.
  *A63B 60/46* (2015.01)
  *A63B 71/06* (2006.01)
  *G06T 7/70* (2017.01)
  *A63B 69/40* (2006.01)

(52) U.S. Cl.
  CPC .......... *A63B 69/0002* (2013.01); *A63B 69/40* (2013.01); *A63B 71/0605* (2013.01); *G06T 7/70* (2017.01); *A63B 2024/0034* (2013.01); *A63B 2069/0006* (2013.01); *A63B 2069/0008* (2013.01); *A63B 2220/806* (2013.01); *A63B 2220/807* (2013.01)

(58) Field of Classification Search
  CPC ............ A63B 2220/05; A63B 2220/12; A63B 2220/806; A63B 2220/807; A63B 2102/18; A63B 71/0605; A63B 60/46; A63F 13/213; A63F 13/573; A63F 13/812; G06T 2207/30221; G06T 7/70
  See application file for complete search history.

(56) References Cited

U.S. PATENT DOCUMENTS

| | | | | |
|---|---|---|---|---|
| 5,768,151 A * | 6/1998 | Lowy | ................ | A63B 24/0021 273/317.1 |
| 5,984,810 A * | 11/1999 | Frye | ................ | A63B 24/0021 473/422 |
| 6,042,492 A * | 3/2000 | Baum | ................ | A63B 24/0003 434/257 |
| 2001/0056000 A1* | 12/2001 | Hori | ................ | A63B 63/00 473/453 |
| 2006/0189418 A1* | 8/2006 | Kawai | ................ | A63B 24/0003 473/451 |
| 2007/0298898 A1* | 12/2007 | Kiraly | ................ | A63B 24/0021 473/131 |
| 2010/0210377 A1* | 8/2010 | Lock | ................ | A63B 24/0003 473/409 |
| 2016/0279496 A1* | 9/2016 | Lee | ................ | G06Q 10/0639 |
| 2016/0279526 A1* | 9/2016 | Lee | ................ | A63F 13/812 |

FOREIGN PATENT DOCUMENTS

| | | |
|---|---|---|
| KR | 10-0411754 A | 12/2003 |
| KR | 10-0919371 B1 | 9/2009 |
| KR | 10-1019823 B1 | 3/2011 |
| KR | 10-1023497 B1 | 3/2011 |
| KR | 10-2012-0016868 B1 | 2/2012 |
| KR | 10-2012-0102952 A | 9/2012 |
| KR | 10-2014-0100685 A | 8/2014 |
| KR | 10-1494204 B1 | 2/2015 |
| KR | 10-1505931 B1 | 3/2015 |
| KR | 10-1543371 B1 | 8/2015 |
| KR | 10-1546666 B1 | 8/2015 |

* cited by examiner

US 10,486,024 B2

SENSING DEVICE AND SENSING METHOD USED IN BASEBALL PRACTICE APPARATUS, BASEBALL PRACTICE APPARATUS USING THE SENSING DEVICE AND THE SENSING METHOD, AND METHOD OF CONTROLLING THE BASEBALL PRACTICE APPARATUS

TECHNICAL FIELD

The present invention relates to a baseball practice apparatus that allows a user to hit a ball pitched by a ball-pitching device with a bat or a baseball practice apparatus such as a screen baseball system that allows a user to hit, with a bat, a ball pitched by a ball-pitching device in an indoor space of a predetermined size, senses hitting through a sensing device, and realizes a simulation image according to the sensing result, a sensing device and a sensing method used in the baseball practice apparatus, and a method of controlling the baseball practice apparatus.

BACKGROUND ART

With the recent increase in the number of people enjoying baseball, a so-called screen baseball system has emerged, which overcomes the limitations of playing baseball in a wide baseball stadium and allows people to enjoy playing a virtual baseball game even in a small indoor space while experiencing virtual reality.

Typically, a screen baseball system is installed in an indoor space and has a batting area with a space of a predetermined size in which a user can bat and a screen capable of displaying a virtual baseball field. When a pitching machine installed on the back of the screen pitches a ball toward the batting area, a user who is ready to hit the ball in the batting area hits the ball pitched by the pitching machine. At this time, a sensing device senses the movement of the pitched ball and the movement of the ball hit by the user. Subsequently, based on the result of sensing, whether the pitched ball is a strike or a ball is determined, and an image simulating the trajectory of the hit ball is realized on the screen.

In connection with the sensing device, a conventional screen baseball system is configured to have a structure in which a plurality of optical sensor devices, each of which includes a plurality of light-emitting sensors and a plurality of light-receiving sensors, is installed in a path along which a pitched ball or a hit ball moves such that, when the ball passes by the optical sensor devices, the light-receiving sensors receives the light emitted by the light-emitting sensors and reflected by the ball, whereby each of the optical sensor devices acquires information about the coordinates of the ball in order to calculate the speed, direction, and the like of the pitched ball or the hit ball based thereon.

In the case in which a user hits a ball with a bat, whether the user swung or hit the ball is sensed using an additional sensor device.

The above-described technical content is disclosed in a plurality of related art documents, such as Korean Patent Application No. 10-2015-0041844, Korean Patent Application No. 10-2015-0041861, Korean Patent Application No. 10-2014-0054105, U.S. Pat. No. 5,443,260, and Japanese Registered Patent No. 4743763.

In the case in which a sensor device based on an optical sensor is used, as described above, it is necessary to provide a considerable number of light-emitting sensors and light-receiving sensors. As a result, costs related to the sensor device are considerably increased. In addition, there is a strong possibility of the sensor device being damaged or malfunctioning, whereby it is very difficult to maintain and repair the sensor device. Nevertheless, accurate analysis of a ball motion is limited, whereby accuracy in simulation of the ball motion is very low.

An image-processing-type sensing device that is capable of acquiring an image of the motion of a pitched ball or a hit ball, analyzing the acquired image, and calculating various kinds of information showing how the ball moves in a baseball practice apparatus has been proposed.

The image-processing-type sensing device is advantageous in that a plurality of frames of an image is processed in order to accurately analyze the motion of a pitched ball or a hit ball but is disadvantageous in that it is not possible to perform effective and rapid processing, since the number of images is very large and the amount of data generated as the result of processing the images is also very large.

DISCLOSURE

Technical Problem

It is an object of the present invention to provide an image-processing-type sensing device and sensing method that are capable of acquiring an image of the motion of a pitched ball or a hit ball and analyzing the acquired image in order to calculate an accurate and rapid motion model of the ball, which shows how the ball moves, in a baseball practice apparatus that allows a user to perform a baseball practice or to play a baseball game, whereby it is possible to very accurately and rapidly calculate various kinds of information necessary for conducting the baseball practice or the baseball game, such as motion parameters of the pitched ball or the hit ball, a baseball practice apparatus using the sensing device and the sensing method, and a method of controlling the baseball practice apparatus.

It is another object of the present invention to provide a baseball practice apparatus that provides a virtual environment and a play method for allowing a user to hit a ball in a batting area in an offensive mode or to pitch a ball in the batting area in a defensive mode based on an image, and a sensing device and a sensing method for performing a process of sensing a ball motion when the user plays in the offensive mode or when the user plays in the defensive mode in order to accurately and rapidly calculate sensing information in the baseball practice apparatus.

Technical Solution

In accordance with an aspect of the present invention, the above and other objects can be accomplished by the provision of a sensing device used in a baseball practice apparatus that allows a user to perform a baseball practice or to play a baseball game based on a virtual baseball image, the sensing device including a camera device for successively capturing images of a moving ball and a sensing-processor for extracting and analyzing a predetermined trigger area from each of the images captured by the camera device to generate a trigger for commencing a process of sensing the moving ball and performing the sensing process to calculate sensing information about the moving ball when the trigger is generated.

In accordance with another aspect of the present invention, there is provided a sensing method of a sensing device used in a baseball practice apparatus that allows a user to perform a baseball practice or to play a baseball game by hitting a ball pitched by a ball-pitching device in a batting area based on a virtual baseball image, the sensing method including capturing images of the motion of the ball pitched by the ball-pitching device, extracting a trigger area of a predetermined size from a predetermined position in each of the captured images, analyzing an image of the extracted trigger area to generate a trigger for commencing a process of calculating a ball motion model of the moving ball, and extracting a ball from each of the images, calculating coordinates of the ball in a three-dimensional space, and calculating the ball motion model using the calculated coordinate data when the trigger is generated.

In accordance with another aspect of the present invention, there is provided a sensing method of a sensing device used in a baseball practice apparatus that allows a user to perform a baseball practice or to play a baseball game by pitching a ball toward a screen in a mound based on a virtual baseball image projected on the screen, the sensing method including capturing images of the motion of the ball pitched by the user, extracting a trigger area of a predetermined size from a predetermined position in each of the captured images, analyzing an image of the extracted trigger area to generate a trigger for commencing a process of calculating a ball motion model of the moving ball, and extracting a ball from each of the images, calculating coordinates of the ball in a three-dimensional space, and calculating the ball motion model using the calculated coordinate data when the trigger is generated.

In accordance with another aspect of the present invention, there is provided a sensing method of a sensing device used in a baseball practice apparatus that allows a user to perform a baseball practice or to play a baseball game based on a virtual baseball image projected on a screen, the sensing method including executing one of a batter mode, in which a process of sensing a ball motion is performed when the user hits a ball pitched by a ball-pitching device in a batting area, and a pitcher mode, in which a process of sensing a ball motion is performed when the user pitches a ball toward the screen, according to a signal from a control device of the baseball practice apparatus, capturing images by a camera device when one of the batter mode and the pitcher mode is executed, extracting a trigger area of a predetermined size from a predetermined position in each of the captured images, detecting a ball from the trigger area and a direction in which the ball advances to generate a trigger for commencing a process of calculating a ball motion model of the moving ball, and extracting a ball from each of the images, calculating coordinates of the ball in a three-dimensional space, and calculating the ball motion model using the calculated coordinate data when the trigger is generated.

In accordance with another aspect of the present invention, there is provided a method of controlling a baseball practice apparatus that allows a user to perform a baseball practice or to play a baseball game based on a virtual baseball image, the method including realizing an image of a virtual pitcher pitching a ball by a control device for realizing an image for conducting the baseball practice or the baseball game, performing control such that a ball-pitching device pitches a ball toward a batting area while being synchronized with the image of the virtual pitcher pitching the ball, capturing images of the motion of the ball pitched by the ball-pitching device and extracting a trigger area of a predetermined size from a predetermined position in each of the captured images by a sensing device, analyzing an image of the extracted trigger area to generate a trigger for commencing a process of sensing the moving ball by the sensing device, performing the process of sensing the moving ball by the sensing device to calculate sensing information when the trigger is generated, and realizing a simulation image when the user hit the ball or an image for conducting the baseball practice or the baseball game when the user did not hit the ball based on the sensing information, received from the sensing device, by the control device.

In accordance with another aspect of the present invention, there is provided a method of controlling a baseball practice apparatus that allows a user to perform a baseball practice or to play a baseball game based on a virtual baseball image projected on a screen, the method including realizing an image of a virtual catcher, a virtual batter, and a virtual umpire by a control device for realizing an image for conducting the baseball practice or the baseball game, capturing images of the motion of the ball pitched by the user and extracting a trigger area of a predetermined size from a predetermined position in each of the captured images by a sensing device, analyzing an image of the extracted trigger area to generate a trigger for commencing a process of sensing the moving ball by the sensing device, performing the process of sensing the moving ball by the sensing device to calculate sensing information when the trigger is generated, and realizing an image of the virtual catcher, the virtual batter, and the virtual umpire responding to the ball pitched by the user based on the sensing information, received from the sensing device, by the control device.

In accordance with a further aspect of the present invention, there is provided a baseball practice apparatus that allows a user to perform a baseball practice or to play a baseball game based on a virtual baseball image projected on a screen, the baseball practice apparatus including a ball-pitching device for pitching a ball toward a batting area, in which the user hits the ball, a sensing device for successively capturing and collecting images of the motion of a ball pitched by the ball-pitching device, a ball hit by the user, or a ball pitched by the user, analyzing the collected images, and performing a process of sensing a moving ball to calculate sensing information of the moving ball, and a control device for receiving the information calculated by the sensing device and realizing an image for conducting the baseball practice or the baseball game based on the received information, wherein the control device is configured to selectively or alternately execute an offensive mode, in which an image of a defensive team including a virtual pitcher is realized and the user hits a ball pitched by the ball-pitching device in the batting area in order to conduct the game, or a batting practice mode, in which the user can practice batting, and a defensive mode, in which an image of a virtual catcher, a virtual batter, and a virtual umpire is realized and the user pitches a ball in the batting area in order to conduct the game, or a pitching practice mode, in which the user can practice pitching, and to transmit a signal indicating the executed mode to the sensing device, and wherein the sensing device is configured to execute one of a batter mode, in which a process of sensing a ball motion is performed in the offensive mode or the batting practice mode, and a pitcher mode, in which a process of sensing a ball motion is performed in the defensive mode or the pitching practice mode, according to a signal from the control device, and is configured to extract and analyze a predetermined trigger area from each image captured by a camera device in order to generate a trigger for commencing a process of sensing a moving ball when one of the batter mode and the pitcher mode is executed and to perform the sensing process in order to calculate sensing information about the moving ball when the trigger is generated.

Advantageous Effects

The sensing device and the sensing method used in the baseball practice apparatus, the baseball practice apparatus using the sensing device and the sensing method, and the method of controlling the baseball practice apparatus according to the present invention have the effect of acquiring an image of the motion of a pitched ball or a hit ball and analyzing the acquired image in order to calculate an accurate and rapid motion model of the ball, which shows how the ball moves, whereby it is possible to very accurately and rapidly calculate various kinds of information necessary for conducting a baseball practice or a baseball game, such as motion parameters of the pitched ball or the hit ball.

In addition, the present invention provides a baseball practice apparatus that provides a virtual environment and a play method for allowing a user to hit a ball in a batting area in an offensive mode or to pitch a ball in the batting area in a defensive mode based on an image. Consequently, the baseball practice apparatus allows the user to play in various modes, such as the offensive mode and the defensive mode. Furthermore, it is possible for the sensing device and the sensing method to perform a process of sensing the ball motion when the user plays in the offensive mode or when the user plays in the defensive mode, whereby it is possible to accurately and rapidly calculate sensing information in the baseball practice apparatus.

DESCRIPTION OF DRAWINGS

FIGS. 1 and 2 are views showing an example of a virtual baseball simulation system, i.e. a so-called screen baseball system, realized as a baseball practice apparatus according to an embodiment of the present invention, wherein FIG. 1 shows an offensive mode and FIG. 2 shows a defensive mode;

BEST MODE

A sensing device and a sensing method used in a baseball practice apparatus, a baseball practice apparatus using the sensing device and the sensing method, and a method of controlling the baseball practice apparatus according to the present invention will be described in detail with reference to the accompanying drawings.

In the following description of the present invention, a "baseball practice apparatus" according to the present invention conceptually includes both a conventional baseball practice system, in which a pitching machine pitches a ball to allow batting practice and a user hits the pitched ball in a batting area, and a virtual baseball simulation system, which is installed in an indoor space, which has a batting area with a space of a predetermined size where a user can bat and a screen capable of displaying a virtual baseball field, and which is operated in such a manner that, when the pitching machine pitches a ball toward the batting area, a user who is ready to hit the ball in the batting area hits the ball pitched by the pitching machine, a sensing device senses the movement of the pitched ball and the movement of the ball hit by the user, and an image simulating the trajectory of the hit ball is realized on the screen based on the result of sensing. Hereinafter, the present invention will be described in detail.

Figure 1:
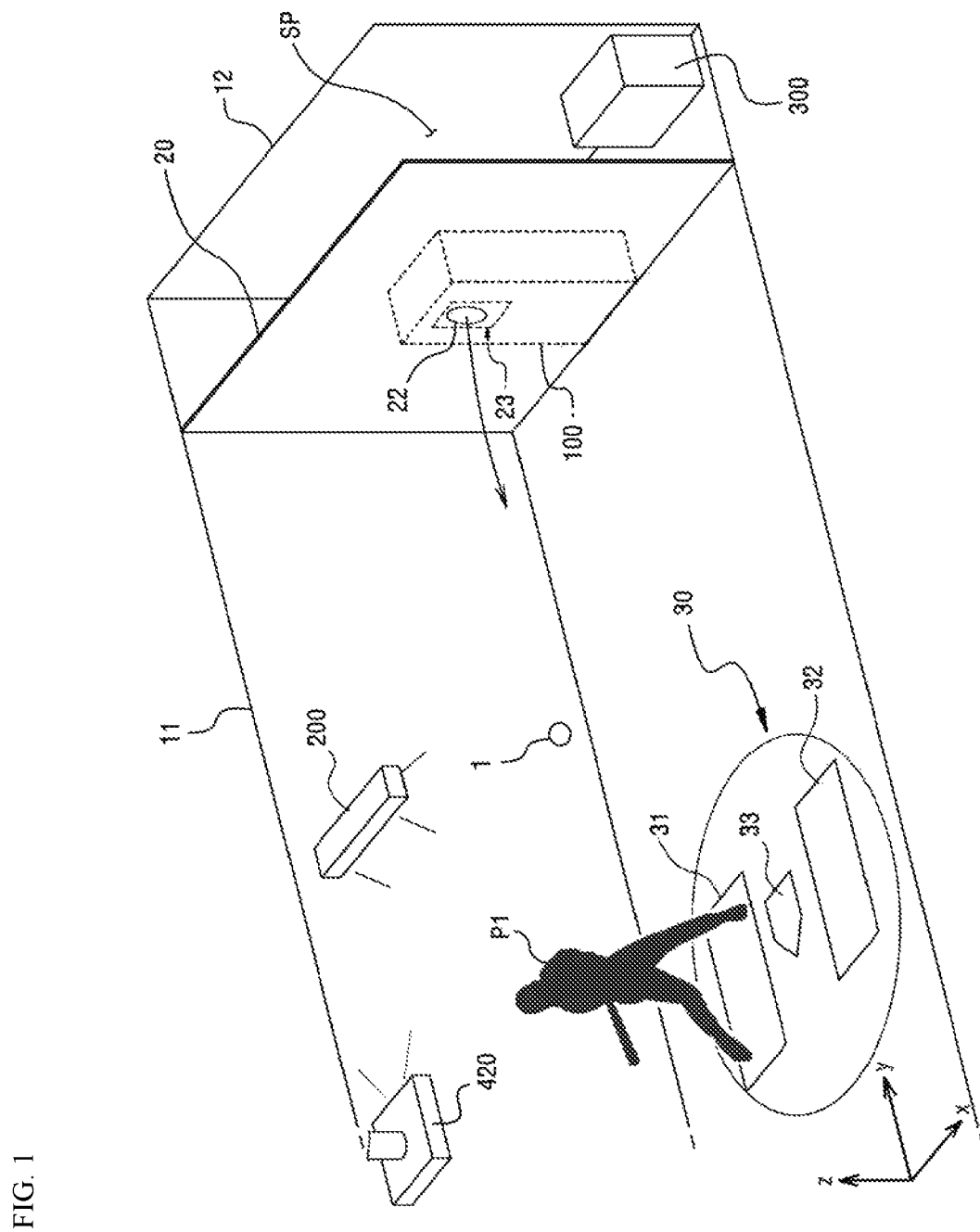
Figure 2:
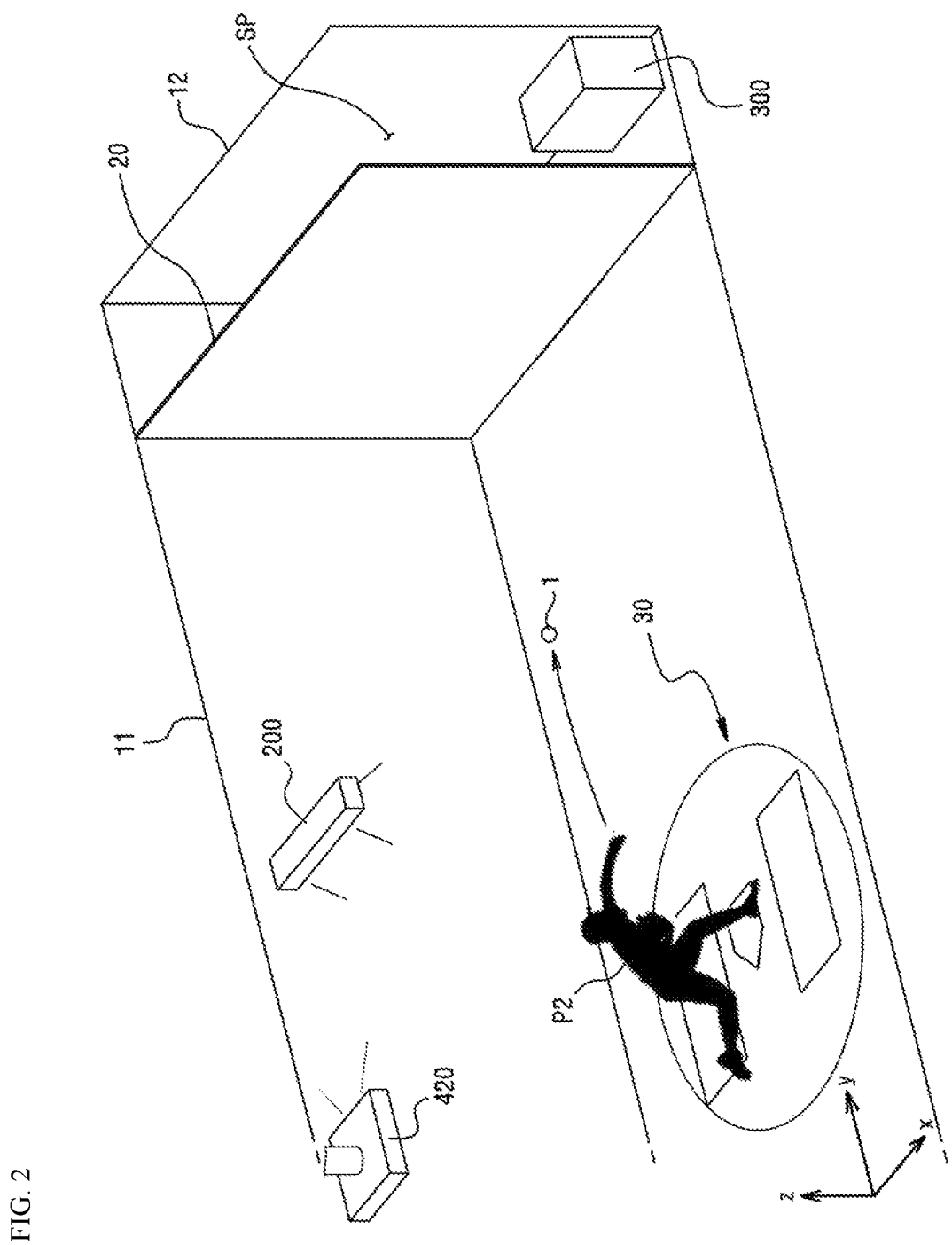
Figure 3:
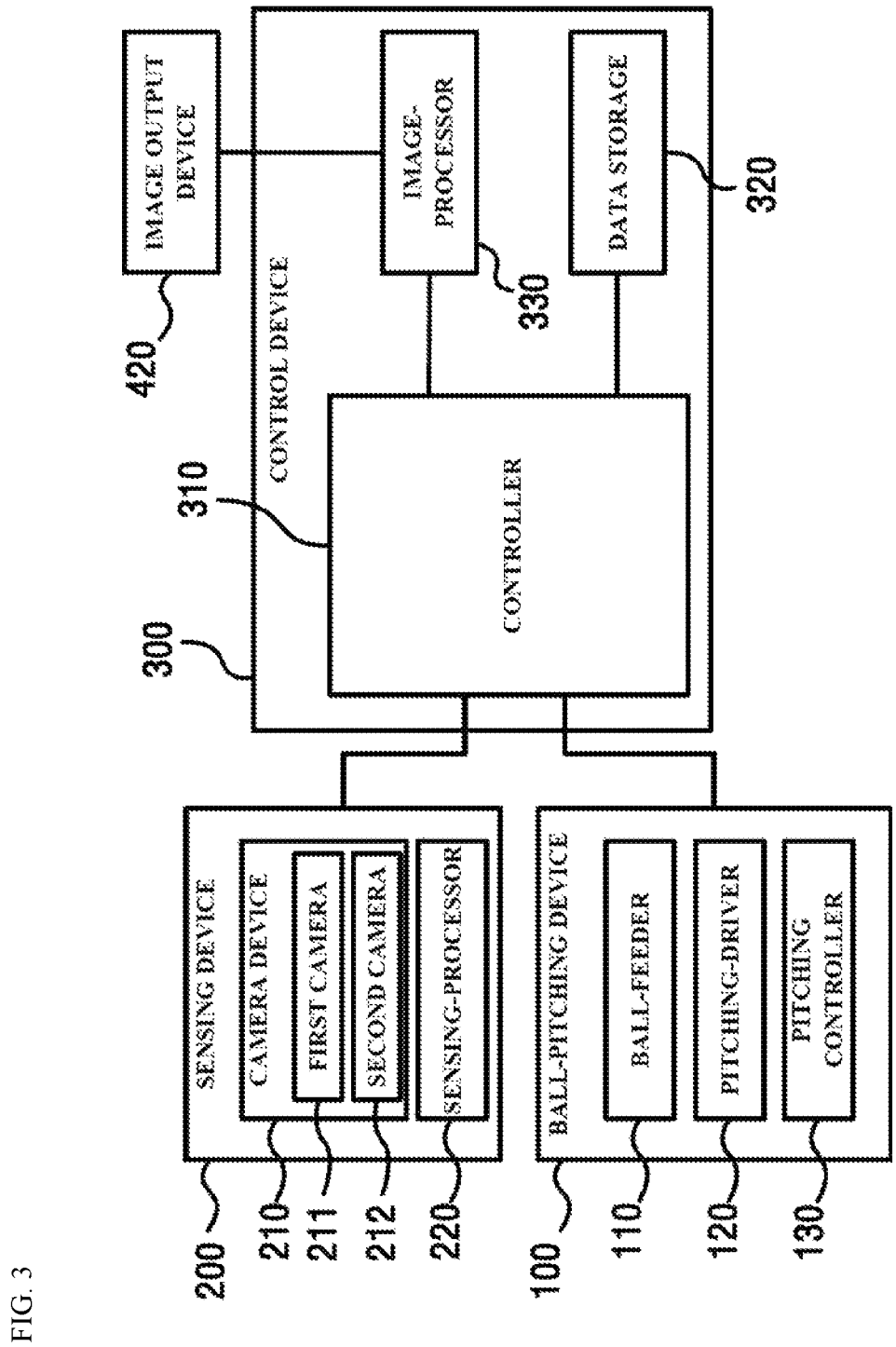
FIG. 3 is a block diagram showing the configuration of the baseball practice apparatus shown in FIGS. 1 and 2.

First, a baseball practice apparatus according to an embodiment of the present invention will be described with reference to FIGS. 1 to 3. FIGS. 1 and 2 are views showing an example of a virtual baseball simulation system, i.e. a so-called screen baseball system, realized as a baseball practice apparatus according to an embodiment of the present invention, wherein FIG. 1 shows the case in which a user plays baseball in an offensive mode, in which the user hits a ball, and FIG. 2 shows the case in which a user plays baseball in a defensive mode, in which the user pitches a ball. FIG. 3 is a block diagram showing the configuration of the baseball practice apparatus shown in FIGS. 1 and 2.

In the same manner as a typical screen baseball system, as shown in FIGS. 1 and 2, a baseball practice apparatus according to an embodiment of the present invention includes a batting area 30 and a screen 20, which are arranged in a space defined by a side wall 11 and a rear wall 12, and is configured such that a user can swing and hit a ball with a bat in a batter's box 31 or 32 of the batting area 30. Here, reference numeral 31 denotes the right-handed batter's box, and reference numeral 32 denotes the left-handed batter's box. Hereinafter, the right-handed batter's box and the left-handed batter's box will be collectively referred to as a "batter's box", which is defined as including at least one of the right-handed batter's box or the left-handed batter's box.

The baseball practice apparatus according to the embodiment of the present invention may selectively provide an offensive mode, in which a user hits a ball, i.e. the user is a hitter (a batter mode for a sensing device), and a defensive mode, in which the user pitches a ball, i.e. the user is a pitcher (a pitcher mode for the sensing device). In the defensive mode, the batting area 30 serves as a mound. As shown in FIG. 2, therefore, the user may pitch a ball on the batting area 30, which serves as a mound, in the defensive mode.

In a space SP between the screen 20 and the rear wall 12 may be provided a control device 300 for processing information on a baseball simulation image to be projected onto the screen 20 (the image processed by the control device 300 is projected onto the screen 20 through an image output device 420), and may be installed a ball-pitching device 100 that is capable of pitching a ball 1 toward the batting area 30. A pitching hole 22 may be formed in the screen 20 at a position corresponding to the portion of the ball-pitching device 100 from which the ball is pitched such that the ball 1 can pass though the pitching hole 22.

As shown in FIG. 1, the ball-pitching device 100 may be provided in the front thereof with a hole opening and closing unit 23 for opening and closing the pitching hole 22 in the screen 20.

In the baseball practice apparatus according to the embodiment of the present invention, as shown in FIG. 1, an offensive mode, in which a user P1 hits a ball pitched by the ball-pitching device 100 in order to conduct a baseball game, or a batting practice mode, in which the user P1 can practice batting, may be set such that a baseball game or a baseball practice can be conducted in the offensive mode or in the batting practice mode, respectively.

At this time, an image of a defensive team including a virtual pitcher is projected on the screen 20 such that the user P1 plays against the virtual defensive team in a virtual baseball field in order to conduct the baseball practice or the baseball game.

In addition, in the baseball practice apparatus according to the embodiment of the present invention, as shown in FIG. 2, a defensive mode, in which a user P2 directly pitches a ball toward the screen 20 in order to conduct a baseball game, or a pitching practice mode, in which the user P2 can practice pitching, may be set such that a baseball game or a baseball practice can be conducted in the defensive mode or in the pitching practice mode, respectively.

At this time, an image of a virtual catcher, a virtual batter, a virtual umpire, and the like is projected on the screen 20 such that the user P2 plays against a virtual offensive team in a virtual baseball field in order to conduct the baseball practice or the baseball game.

The offensive mode or the defensive mode may be selectively executed by the user. Alternatively, a team to which the user belongs and an opponent team that is selected by the user or a predetermined opponent team may alternately play in the offensive mode and the defensive mode in a virtual baseball field, as if an actual baseball game were being played. That is, the offensive mode and the defensive mode may be alternately executed.

When the control device of the baseball practice apparatus according to the embodiment of the present invention performs control such that the offensive mode or the batting practice mode is executed, as described above, the sensing device may be set to perform a sensing process based on the executed mode. Even when the control device performs control such that the defensive mode or the pitching practice mode is executed, the sensing device may be set to perform a sensing process based on the executed mode. The sensing process will be described hereinafter in more detail.

As shown in FIGS. 1 to 3, a control system of the baseball practice apparatus according to the embodiment of the present invention may include a control device 300, a ball-pitching device 100, and a sensing device 200.

As shown in FIG. 3, the ball-pitching device 100 may include a ball-feeder 110, a pitching-driver 120, and a pitching controller 130.

The ball-feeder 110 is a component that feeds balls one by one from a storage box in which a plurality of balls is stored to the pitching-driver 120, i.e. to a position for pitching.

The pitching-driver 120 is a component for pitching a ball fed by the ball-feeder 110. The pitching-driver 120 may be realized in various ways. For example, the pitching-driver 120 may be realized so as to rotate a wheel and pitch a ball placed between the wheel and a guide plate using the rotational force of the wheel (e.g. Japanese Patent Application Publication No. 2014-217468), may be realized so as to rotate two or more wheels, to locate a ball between the wheels, and to pitch the ball using the rotational force of the wheels (e.g. Korean Patent Application Publication No. 2014-0100685, Korean Registered Patent No. 0411754, and Korean Registered Utility Model No. 0269859), or may be realized so as to throw a ball by rotating an arm holding the ball (e.g. Korean Registered Patent No. 0919371).

Concrete configurations of the ball-feeder 110 and the pitching-driver 120 have already been disclosed in various related art documents, and therefore a detailed description thereof will be omitted.

The sensing device 200 analyzes a captured image to sense an object in the image. The sensing device 200 acquires and analyzes an image of a predetermined image-capture range including the batting area 30 in order to calculate various kinds of sensing information such that a baseball practice or a baseball game can be conducted based on the image in a virtual baseball field when the offensive mode or the batting practice mode is executed or when the defensive mode or the pitching practice mode is executed, and transmits the calculated sensing information to the control device.

As shown in FIG. 3, the sensing device 200 may include a camera device 210 and a sensing-processor 220. The camera device 210 successively acquires images of a predetermined image-capture range including the batting area 30. The sensing-processor 220 receives the images from the camera device 210 and performs a sensing process, such as image analysis according to preset conditions, in order to calculate sensing information necessary for a baseball practice or a baseball game using the baseball practice apparatus.

The camera device 210 of the sensing device 200 may include a first camera 211 and a second camera 212, which capture images of the same image-capture range at different positions, i.e. stereoscopic images, in order to calculate three-dimensional position information of an object in the captured images such that the sensing-processor 220 analyses the images captured by the camera device 210 in order to acquire three-dimensional coordinate data of the ball.

The sensing-processor 220 receives and collects the captured images from the first camera 211 and the second camera 212 of the camera device 210, analyzes the collected images to extract three-dimensional coordinate data of the ball in the images, calculates a motion model of the ball pitched by the ball-pitching device, the hit ball, or the ball pitched by the user using the extracted three-dimensional coordinate data, and calculates, using the calculated ball motion model, various kinds of information necessary for a baseball practice or a baseball game using the baseball practice apparatus.

Here, the ball motion model may be expressed by a motion equation of the trajectory of a fired ball, a hit ball, or a pitched ball in a three-dimensional space. As shown in FIGS. 1 and 2, a space in which a baseball practice or a baseball game using the baseball practice apparatus is performed may be defined based on a three-dimensional coordinate system including an x-axis, a y-axis, and a z-axis such that the ball motion model can be determined based on the defined coordinate system.

That is, the ball motion model may be defined by a motion equation in the x-axis direction, a motion equation in the y-axis direction, and a motion equation in the z-axis direction. A function of the ball motion in the x-axis direction, a function of the ball motion in the y-axis direction, and a function of the ball motion in the z-axis direction may be predefined and set, a ball may be extracted through image analysis, and coordinate data of the extracted ball in a three-dimensional space (i.e. coordinate data of the extracted ball in the x-y-z coordinate system) may be applied to each function in each axial direction in order to acquire a motion equation in each axial direction, whereby the ball motion model may be calculated.

The sensing device 200 may calculate the ball motion information and transmit the calculated ball motion information to the control device 300. The control device 300 may realize an image simulating the ball motion based on the received ball motion information and project the realized simulation image onto the screen 20 through the image output device 420.

Meanwhile, as shown in FIG. 3, the control device 300 may include a data storage 320, an image-processor 330, and a controller 310.

The data storage 320 is a unit that stores data for processing a baseball simulation image in the baseball practice apparatus. The data storage 320 may be configured to serve as a storage space for temporarily storing data received from a server (not shown).

The image-processor 330 processes the image data according to a preset program in order to generate various kinds of baseball-simulation-related images including a background image such as an image of a virtual baseball field and images of players, umpires, spectators, and the like, an image of a virtual pitcher pitching a ball, an image simulating the trajectory of a ball hit by the user, and an image of a virtual catcher, a virtual batter, a virtual umpire, and the like. The processed image is transmitted to the image output device 420. The image output device 420 outputs the received image by, for example, projecting the received image onto the screen 20 such that the user can see the image.

The controller 310 controls each component of the baseball practice apparatus according to the present invention and performs various operations for realizing a baseball simulation image, such as an image simulating the trajectory of the hit ball, based on various kinds of information received from the sensing device 200.

The controller 310 functions to determine the time at which the pitching hole 22 is opened or closed by the hole opening and closing unit 23, the time at which the ball-pitching device 100 is ready to pitch a ball, and the time at which a prepared ball is pitched (fired), and functions to send a control signal for instructing the pitching controller 130 to perform a corresponding operation.

The hole opening and closing unit 23 is basically controlled so as to keep the pitching hole 22 in the screen 20 closed. When the hole opening and closing unit 23 keeps the pitching hole closed, therefore, an image projected on the screen may be naturally seen without a portion thereof being omitted at the position of the pitching hole.

The controller 310 may control the operation of the ball-pitching device 100 such that the ball-pitching device 100 pitches a ball toward the batting area while being synchronized with the pitching motion of a virtual pitcher in an image of a baseball practice or a baseball game.

For example, the ball-pitching device 100 may sense the pitching motion of the virtual pitcher in the image and the movement state of the pitched ball and pitch a ball prepared so as to correspond to the motion of the virtual pitcher or the state of the pitched ball toward the batting area in order to make the user, who is ready to hit the ball in the batting area, feel as if the ball pitched by the virtual pitcher in the image were actually thrown toward the user.

Hereinafter, a sensing method of the sensing device and a control method of the control device in the baseball practice apparatus according to the embodiment of the present invention will be described with reference to the flowcharts shown in FIGS. 4 to 6.

Figure 4:
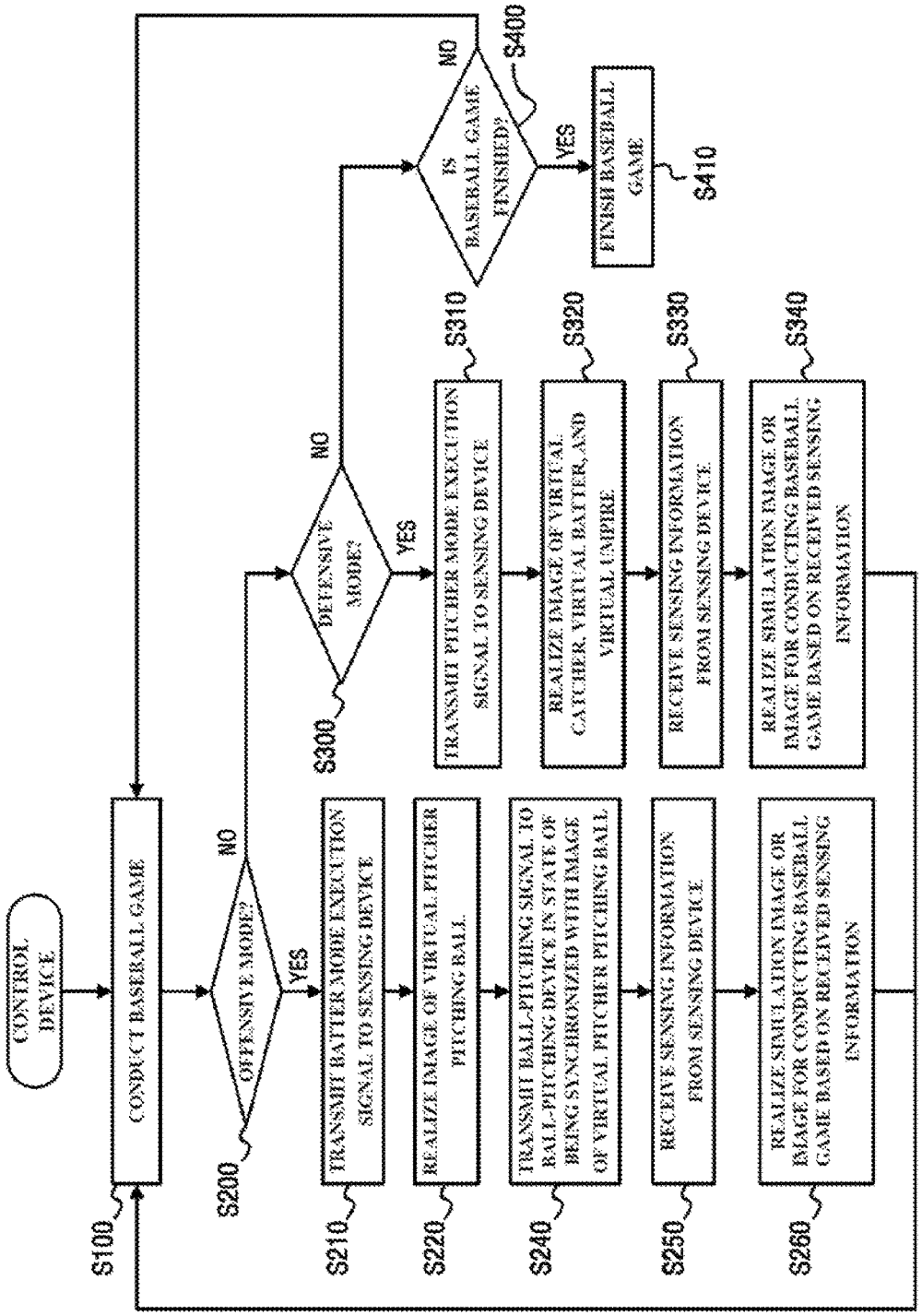
FIGS. 4 to 6 are flowcharts showing a sensing method of a sensing device and a control method of a control device in the baseball practice apparatus having the configuration shown in FIG. 3.
Figure 5:
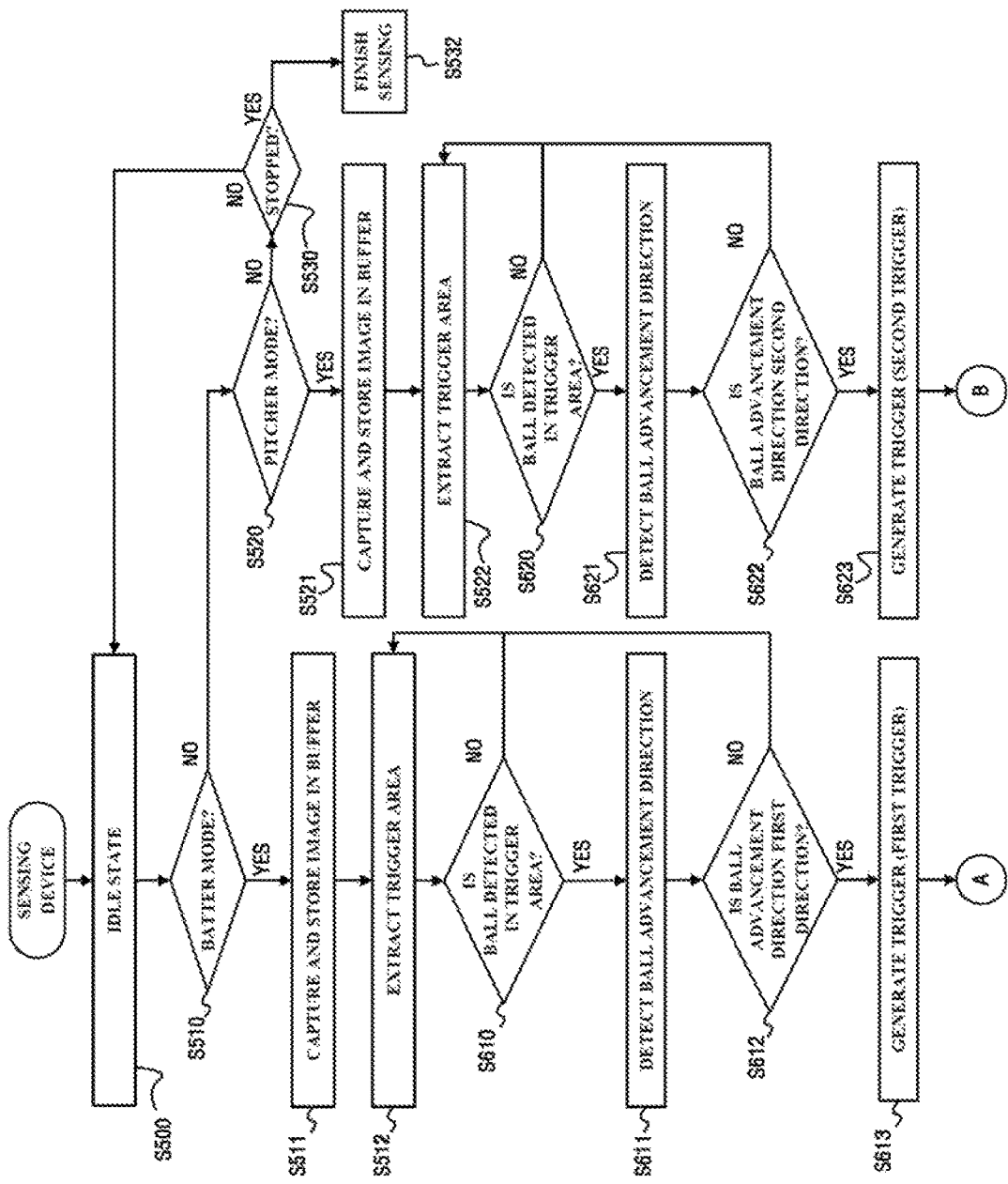
Figure 6:
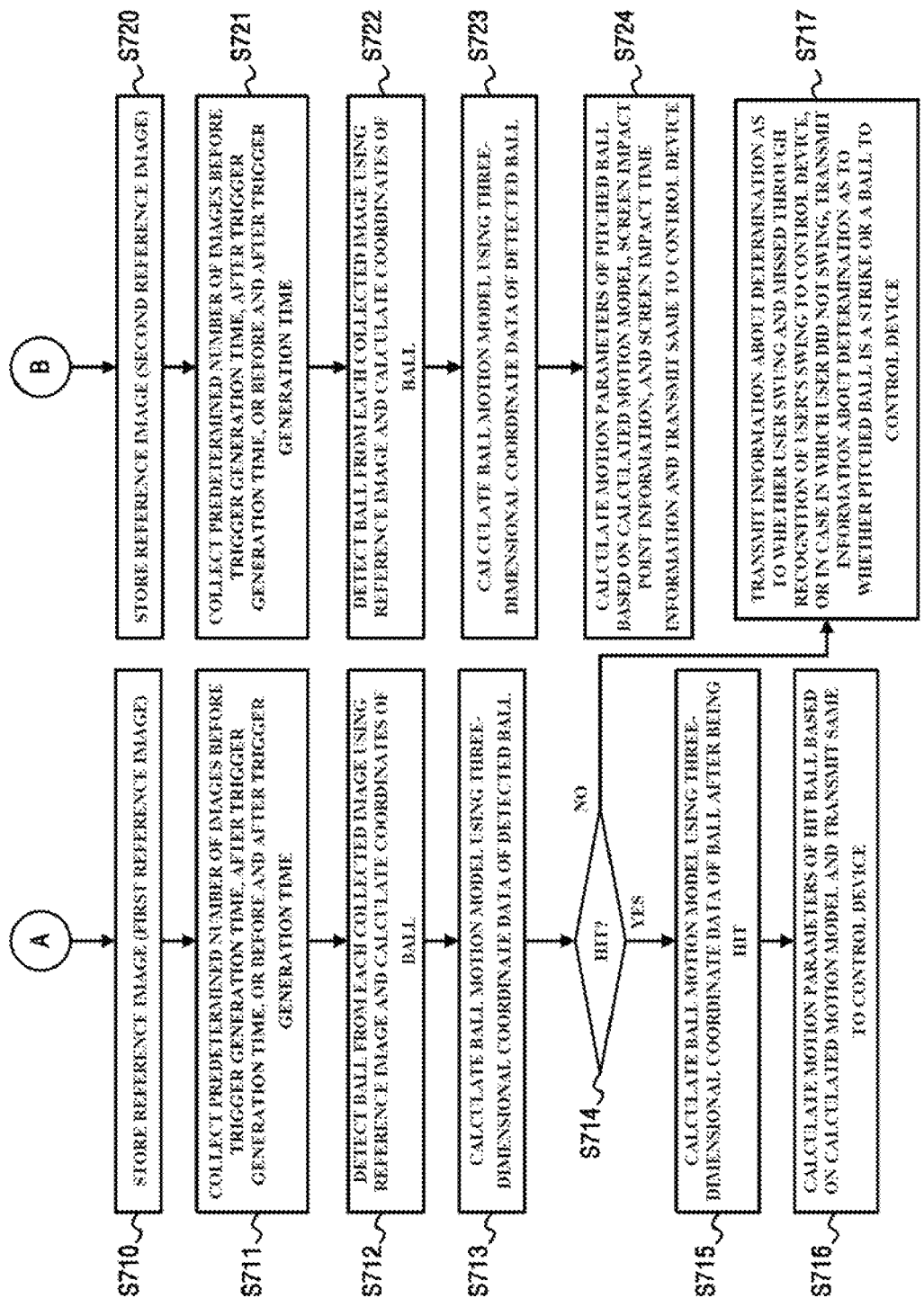

FIGS. 4 to 6 are flowcharts showing a sensing method of the sensing device and a control method of the control device in the baseball practice apparatus having the configuration shown in FIG. 2 (주후 "FIG. 3" 으로 수정하여야 합니다). The steps denoted by A and B in the flowchart shown in FIG. 5 are connected to parts A and B shown in FIG. 6.

First, a control method of the control device in the baseball practice apparatus according to the embodiment of the present invention will be described with reference to FIG. 4.

When a baseball game is conducted in the baseball practice apparatus according to the embodiment of the present invention (S100), a user may select whether to perform a game in an offensive mode or to perform a game in a defensive mode, and the control device may conduct the game in the offensive mode (S200) or in the defensive mode (S300).

According to embodiments, the baseball practice apparatus may provide various kinds of baseball teams, and the user may select a team to which the user will belong and an opponent team in order to conduct a baseball game. At this time, whether to conduct the baseball game in the offensive mode or in the defensive mode may be determined based on which team will play in the offensive mode according to the rules set for the baseball game.

In the case in which neither the offensive mode nor the defensive mode is executed, the control device determines whether the baseball game has finished (S400) and finishes the baseball game (S410), or determines that the mode has not been selected and resumes the baseball game.

Even in the case in which a batting practice mode is executed instead of the offensive mode or a pitching practice mode is executed instead of the defensive mode in FIG. 4, the subsequent process may be performed substantially identically.

When the control device determines to conduct the game in the offensive mode (S200), the control device transmits a batter mode execution signal to the sensing device (S210), and the sensing device is ready to conduct a sensing process based on the batter mode.

When the offensive mode is executed, the image-processor of the control device realizes an image of a virtual pitcher pitching a ball (S220) and transmits a ball-pitching signal to the ball-pitching device in the state of being synchronized with the image of the virtual pitcher pitching the ball (S240). That is, the ball pitched by the virtual pitcher and the ball pitched by the ball-pitching device are synchronized in order to make the user feel as if the ball pitched by the virtual pitcher in the image were actually being thrown toward the user.

When the ball is pitched by the ball-pitching device, the sensing device performs a sensing process set in the batter mode to calculate sensing information, and the control device receives the calculated sensing information from the sensing device (S250).

The control device realizes, based on the received sensing information, a simulation image (for example, an image simulating the trajectory of the ball hit by the user) or an image for conducting the baseball game (for example, when the user swings and misses, the control device may realize an image of the user swinging and missing, an image of the ball being recorded as a strike when the user did not swing, and the like) (S260).

Meanwhile, when the control device determines to conduct the game in the defensive mode (S300), the control device transmits a pitcher mode execution signal to the sensing device (S310), and the sensing device is ready to conduct a sensing process based on the pitcher mode.

When the defensive mode is executed, the image-processor of the control device realizes an image of a virtual catcher, a virtual batter, a virtual umpire, and the like (S320). That is, an image of a virtual catcher being ready to receive a ball and a virtual batter being ready to hit the ball pitched by the user may be realized.

When the user directly pitches a ball toward the screen in this state, the sensing device performs a sensing process set in the pitcher mode to calculate sensing information, and the control device receives the calculated sensing information from the sensing device (S330).

The control device realizes, based on the received sensing information, a simulation image (for example, an image simulating the trajectory of the ball pitched by the user until the virtual catcher receives the ball pitched by the user after the ball pitched by the user reaches the screen) or an image for conducting the baseball game (for example, the control device may realize an image of the ball pitched by the user being recorded as a strike, an image of the virtual batter hitting the ball, and the like) (S340).

Hereinafter, a sensing method of the sensing device performed according to the control method of the control device shown in FIG. 4 will be described with reference to FIGS. 5 and 6.

As shown in FIG. 5, the sensing device is in an idle state until the sensing device receives a mode execution signal from the control device (S500). That is, the sensing device is in a standby state in which data are not processed.

Upon receiving a batter mode execution signal from the control device, the sensing device performs a sensing process based on the batter mode (S510). Upon receiving a pitcher mode execution signal from the control device, the sensing device performs a sensing process based on the pitcher mode (S520).

In the case in which the sensing device does not receive a mode execution signal from the control device during a predetermined time, the sensing device may determine whether to stop the operation thereof (S530), and may finish sensing (S532) or return to the idle state.

Meanwhile, in the case in which the sensing device performs the sensing process based on the batter mode (S510), the camera device of the sensing device captures an image within an image-capture range and stores the captured image in a buffer (S511).

The sensing-processor of the sensing device presets a trigger area in the captured image. A trigger area of a predetermined size is set at a predetermined position in an image, the trigger area is extracted from each image, and the extracted trigger area is investigated (S512).

That is, whether a specific object, i.e. a ball, is detected in the trigger area extracted from each image is investigated.

When a ball is detected in the trigger area (S610), the sensing-processor continuously investigates the trigger area in order to detect the direction in which the detected ball advances, i.e. the ball advancement direction (S611). The sensing-processor may investigate the trigger area in order to detect the ball advancement direction. When the ball is detected in the trigger area, the sensing-processor may investigate a predetermined number of images after the time at which the ball is detected in order to detect the ball advancement direction from the images.

Here, the ball advancement direction will be described. In FIG. 1, the direction in which the ball advances from the screen 20 toward the batting area 30 is defined as a "first direction". In FIG. 1 or 2, the direction in which the ball advances from the batting area 30 toward the screen 20 is defined as a "second direction".

The first direction does not mean only the direction in which the ball directly advances toward the batting area. When the ball advancement direction is divided into axial components based on the coordinate system shown in FIG. 1, a ball advancement direction including a component representing advancement in the direction opposite the y-axis may be defined as the first direction. In addition, the second direction does not mean only the direction in which the ball perpendicularly advances toward the screen. When the ball advancement direction is divided into axial components based on the coordinate system shown in FIG. 1, a ball advancement direction including a component representing advancement in the y-axis direction may be defined as the second direction.

The trigger area may be set at any position between the ball-pitching device and the batting area. A ball pitched by the ball-pitching device may be a bouncing ball and thus fall to the ground or collide with the wall or the ceiling before reaching the batting area. In the case in which the trigger area is set at a position adjacent to the batting area, therefore, such a bouncing ball may not be detected, or may be inaccurately detected at the trigger area.

Consequently, it is preferable to preset the trigger area at a position adjacent to the ball-pitching area.

Referring back to FIG. 5, at step S611, the sensing-processor detects the ball advancement direction in order to determine whether the ball advancement direction is the first direction (S612).

Upon determining that the detected ball advancement direction is the first direction, the sensing-processor generates a trigger (S613). That is, the sensing-processor generates a signal for commencing a process of calculating a ball motion model of the moving ball in the batter mode (in the case in which the ball is pitched by the ball-pitching device or in the case in which the ball is hit by the user).

Here, the trigger in the batter mode, which is distinguished from the trigger in the pitcher mode, is referred to as a "first trigger" (the trigger in the pitcher mode is referred to as a "second trigger"). In the following description, the term "trigger" means the first trigger or the second trigger.

In addition, a trigger area in an image that is investigated in order to generate the trigger in the batter mode, i.e. the first trigger, will be referred to as a first trigger area (a trigger area in the pitcher mode will be referred to as a second trigger area).

The first trigger area and the second trigger area may be set at the same position in an image in the batter mode and in the pitcher mode, or may be set at different positions in the respective modes.

In the case in which the ball advancement direction is not the first direction but the second direction, no trigger is generated.

For example, in the case in which a user who stands in the batting area kicks a ball located on the ground near the batting area toward the screen, the ball may be detected as the result of investigating the trigger area. Since the ball advancement direction is the second direction, no trigger is generated.

That is, in the batter mode, a trigger is generated only in the case in which the ball advances in the first direction. Consequently, it is possible for the sensing device to perform only a process necessary to calculate sensing information without performing unnecessary work, whereby it is possible to effectively and rapidly calculate the sensing information.

Hereinafter, the extraction and analysis of a trigger area will be described in more detail with reference to FIG. 7.

Figure 7:
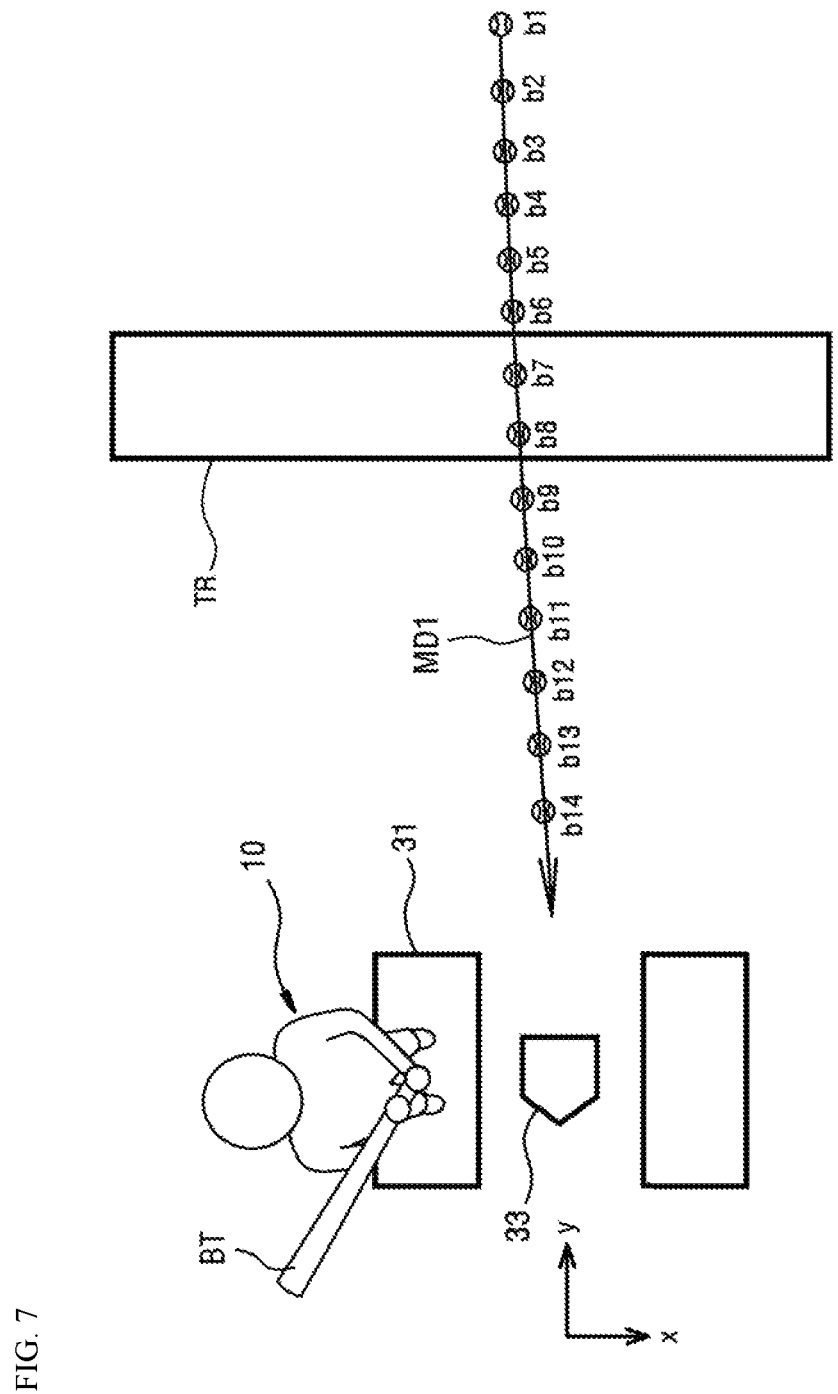
FIG. 7 is a view showing an image captured by a camera constituting a camera device of a sensing device according to an embodiment of the present invention, wherein ball images in a plurality of frames of the image are shown together in order to illustrate the generation of a trigger to commence a process in which the sensing device detects a ball, extracts and analyzes a trigger area, and calculates a ball motion model.

FIG. 7 is a view showing an image captured by one of the cameras constituting the camera device of the sensing device according to the embodiment of the present invention, wherein ball images in a plurality of frames of the image are shown together in order to illustrate a process in which the sensing device detects a ball and extracts and analyzes a trigger area.

As shown in FIG. 7, an image captured and collected by the camera device of the sensing device includes a user 10, who is ready to hit a ball with a bat BT in the batter's box 31, and a home plate 33. In addition, balls b1 to b14 that are moving toward the batting area after the ball is pitched by the ball-pitching device and various kinds of noise appear.

As shown in FIG. 7, the sensing-processor presets a trigger area TR and extracts the trigger area TR from respective images in order to investigate only the extracted trigger area TR.

As described above, the trigger area TR is extracted from the respective images and is analyzed. In the case in which a ball moves and enters the trigger area TR, whereby, for example, a ball b7 is detected, the sensing-processor may extract the trigger area from the next frame of the image in order to detect a ball b8, whereby it is possible to confirm that the ball advancement direction is the direction b7→b8, i.e. the first direction (of course, previous images may be investigated in order to confirm, for example, the direction b1→b2).

As described above, the ball may be detected, and the ball advancement direction in the trigger area may be confirmed in order to generate a trigger.

In the case in which a trigger is generated as the result of extracting the trigger area, determining whether the ball is detected, and investigating the ball advancement direction, as described above, the sensing-processor stores an image at the trigger generation time or a predetermined time after the trigger generation time as a reference image, as shown in FIG. 6 (S710).

The reference image is used to acquire a difference image between respective images in order to detect a ball from the respective images.

In the following description, a reference image stored as the result of the first trigger being generated in the batter mode will be referred to as a first reference image, and a reference image stored as the result of the second trigger being generated in the pitcher mode will be referred to as a second reference image. The term "reference image" may mean the first reference image or the second reference image.

Meanwhile, when the trigger is generated, as described above, the sensing-processor collects a predetermined number of images before the trigger generation time, after the trigger generation time, or before and after the trigger generation time from the buffer (S711), detects a ball from each of the collected images through a difference image using the reference image, and calculates the coordinates of the detected balls in a three-dimensional space (S712).

Subsequently, the sensing-processor calculates a ball motion model through a motion equation describing the ball motion using the calculated three-dimensional coordinate data of the balls (S713).

As can be seen from FIG. 7, a ball motion model, such as a ball motion model MD1, may be calculated using the coordinate data of the moving balls b1 to b14 detected in the respective frames of the image.

Referring back to FIG. 6, the ball motion model is a motion model of the ball that is pitched from the ball-pitching device and then moves toward the batting area. In the case in which the user hits the pitched ball (S714), the sensing device may capture, collect, and analyze images even after the user hits the pitched ball in order to calculate the three-dimensional coordinate data of the ball after being hit, and may also calculate a ball motion model of the hit ball using the calculated three-dimensional coordinate data of the ball, in the same manner as the calculation performed at step S713 (S715).

The sensing-processor calculates motion parameters of the hit ball (e.g. the speed, the direction angle, and the height angle of the ball that is moving) based on the motion model calculated as described above and transmits the calculated motion parameters to the control device (S716).

The control device realizes an image simulating the trajectory of the hit ball based on the received motion parameters in order to conduct the baseball game.

In the case in which the user did not hit the ball pitched by the ball-pitching device, the sensing device may recognize the swing of the user, may determine whether the user swung and missed, and may transmit the information to the control device, and in the case in which the user did not swing, the sensing device may determine whether the ball pitched by the ball-pitching device is a strike or a ball, and may transmit the information to the control device (S717).

Concrete processes related to the recognition of a swing, the determination as to whether the user swung and missed, and the determination as to whether the pitched ball is a ball or a strike do not fall within the scope of the present invention, and therefore a detailed description thereof will be omitted.

Figure 8:
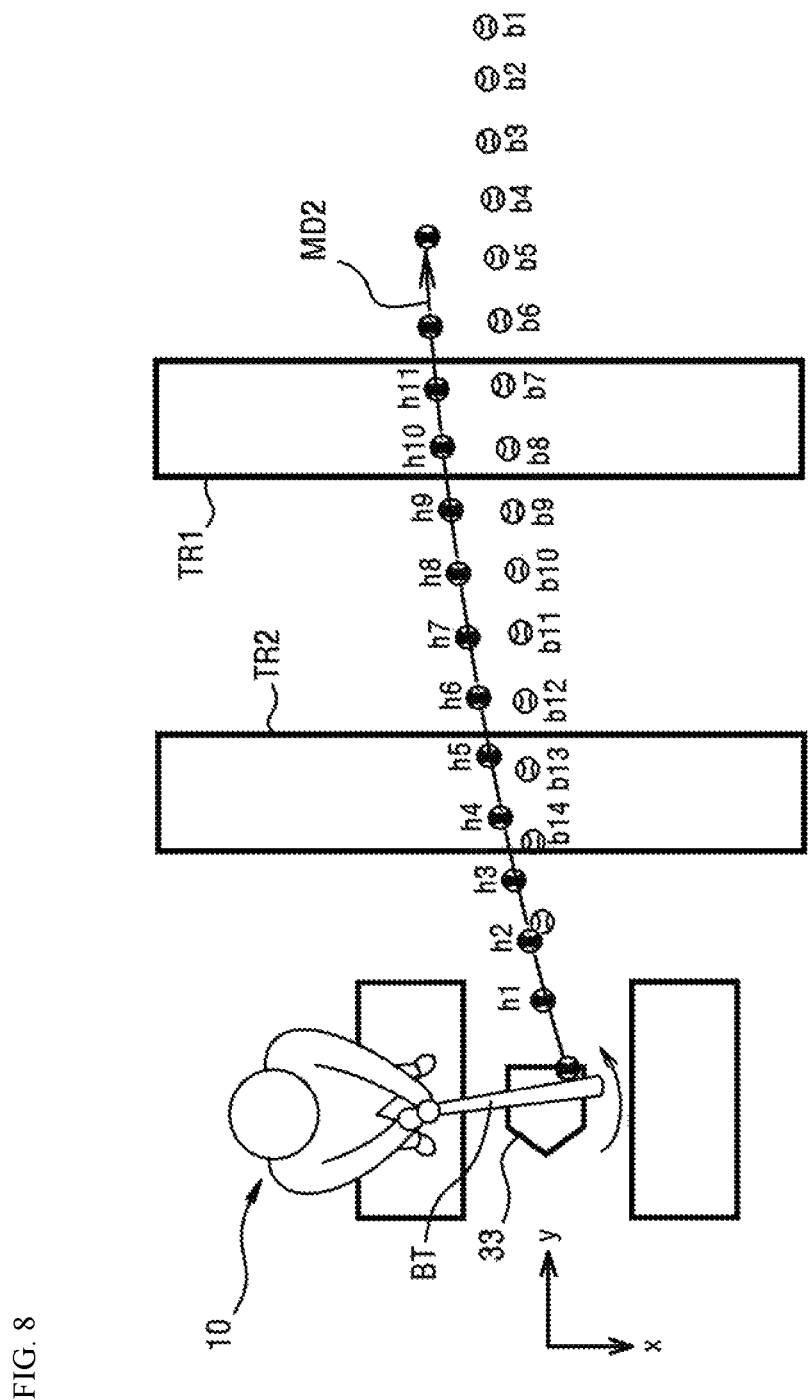
FIG. 8 is a view showing the case in which a sensing device according to another embodiment of the present invention sets and analyzes two trigger areas.

Meanwhile, in the batter mode, two trigger areas may be set, extracted, and investigated in order to generate a trigger due to a ball pitched by the ball-pitching device toward the batting area and a trigger due to a ball hit by the user toward the screen, as shown in FIG. 8, unlike a single trigger area being set, as shown in FIG. 7.

In FIG. 8, b1 to b14 denote balls detected in the respective frames of the image with respect to the ball pitched by the ball-pitching device, and h1 to h11 denote balls detected in the respective frames of the image with respect to the ball hit by the user 10 with the bat BT.

Here, the sensing-processor may preset a first trigger area TR1 and a second trigger area TR2. The first trigger area TR1 may be used to generate a trigger for performing a process of sensing a ball pitched by the ball-pitching device, and the second trigger area TR2 may be used to generate a trigger for performing a process of sensing a ball hit by the user.

The sensing-processor may investigate the first trigger area TR1 first, and in the case in which a trigger is generated as the result of investigating the first trigger area TR1, the sensing-processor may investigate the second trigger area TR2.

The sensing-processor investigates the first trigger area TR1. In the case in which, for example, a ball b7 is detected, the sensing-processor investigates the ball advancement direction. In the case in which the ball advancement direction is the first direction, the sensing-processor generates a trigger.

Subsequently, the sensing-processor investigates the second trigger area TR2. In the case in which a ball b13 is detected, the sensing-processor investigates the ball advancement direction. As a result, the direction b13→b14, i.e. the first direction, is detected. In this case, the sensing-processor does not generate a trigger based on hitting.

Since no trigger is generated, the sensing-processor continuously investigates the second trigger area TR2. In the case in which, for example, a ball h4 is detected in the second trigger area TR2, the sensing-processor investigates the ball advancement direction. As a result, the direction h4→h5, i.e. the second direction, is detected. In this case, the sensing-processor may generate a trigger based on hitting.

When a trigger is generated as the result of investigating the first trigger area TR1, the sensing-processor may perform a process of calculating a ball motion model of the ball pitched by the ball-pitching device. Subsequently, when a trigger is generated as the result of investigating the second trigger area TR2, the sensing-processor may perform a process of calculating a ball motion model of the ball hit by the user.

After a trigger is generated as the result of investigating the first trigger area TR1, the user may swing and miss, or may not swing. In this case, it may be possible to stop investigation of the second trigger area TR2 after a predetermined time, instead of continuously investigating the second trigger area TR2.

The ball motion model of the ball hit by the user may be calculated as a ball motion model MD2 using the coordinate data of h1 to h11, as shown in FIG. 8.

In the embodiment shown in FIG. 8, a plurality of trigger areas, including a first trigger area and a second trigger area, is preset and investigated in order to generate a trigger based on pitching and a trigger based on hitting. Alternatively, the sensing device may be configured such that a single trigger area is preset and investigated in order to generate a trigger based on pitching and a trigger based on hitting.

For example, a trigger area of a predetermined size may be set at an approximate middle position in a captured image, and the trigger area of a ball pitched by the ball-pitching device may be investigated. In the case in which the ball advancement direction is the first direction and thus a trigger is generated, the trigger area is investigated again to determine whether the ball advances in the second direction in order to generate a trigger based on hitting.

Referring back to FIG. 5, in the case in which the sensing device performs a sensing process in the pitcher mode (S520), the camera device of the sensing device captures an image within an image-capture range and stores the captured image in the buffer (S521).

The sensing-processor of the sensing device presets a trigger area (a second trigger area) in the captured image. The sensing-processor sets an area of a predetermined size at a predetermined position in an image, extracts the trigger area from respective images, and investigates the extracted trigger area (S522).

When a ball is detected in the trigger area (S620), the sensing-processor continuously investigates the trigger area in order to detect the direction in which the detected ball advances, i.e. the ball advancement direction (S621). The sensing-processor may investigate the trigger area in order to detect the ball advancement direction. Alternatively, when a ball is detected in the trigger area, the sensing-processor may investigate a predetermined number of images after the time at which the ball is detected in order to detect the ball advancement direction from the images.

The sensing-processor detects the ball advancement direction in order to determine whether the ball advancement direction is the second direction (S622).

Upon determining that the ball advancement direction is the second direction, the sensing-processor generates a trigger (i.e. a second trigger) (S623). That is, the sensing-processor generates a signal for commencing a process of calculating a ball motion model of the moving ball in the pitcher mode (in the case in which the ball is pitched by the user).

In the case in which the ball advancement direction is not the second direction but the first direction, no trigger is generated.

That is, in the pitcher mode, a trigger is generated only in the case in which the ball advances in the second direction. Consequently, it is possible for the sensing device to perform only a process necessary to calculate sensing information without performing unnecessary work, whereby it is possible to effectively and rapidly calculate the sensing information.

Hereinafter, the extraction and analysis of a trigger area in the pitcher mode will be described in more detail with reference to FIG. 9.

Figure 9:
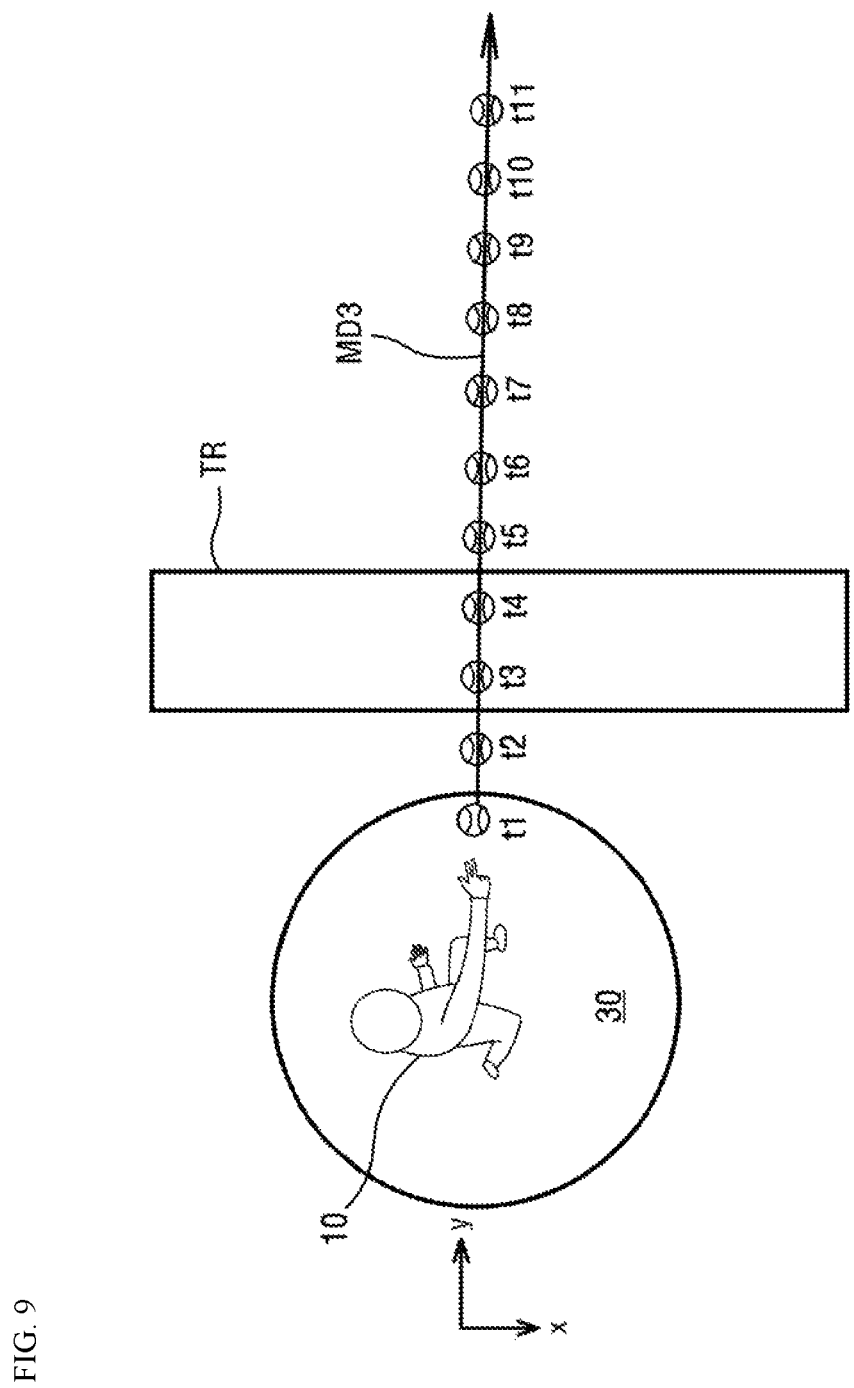
FIG. 9 is a view showing an image captured by a camera constituting the camera device of the sensing device according to an embodiment of the present invention, wherein ball images in a plurality of frames of the image are shown together in order to illustrate the generation of a trigger to commence a process in which the sensing device detects a ball, extracts and analyzes a trigger area, and calculates a ball motion model.

FIG. 9 is a view showing an image captured by one of the cameras constituting the camera device of the sensing device according to the embodiment of the present invention, wherein ball images in a plurality of frames of the image are shown together in order to illustrate a process in which the sensing device detects a ball and extracts and analyzes a trigger area.

As shown in FIG. 9, an image captured and collected by the camera device of the sensing device includes a user 10, who pitches a ball in the batting area. In addition, balls t1 to t11 that are moving toward the screen after the ball is pitched by the user and various kinds of noise appear.

As shown in FIG. 9, the sensing-processor presets a trigger area TR and extracts the trigger area TR from respective images in order to investigate only the extracted trigger area TR.

As described above, the trigger area TR is extracted from the respective images and is analyzed. In the case in which a ball moves and enters the trigger area TR, whereby, for example, a ball t3 is detected, the sensing-processor may extract the trigger area from the next frame of the image in order to detect a ball t4, whereby it is possible to confirm that the ball advancement direction is the direction t3→t4, i.e. the second direction (of course, previous images may be investigated in order to confirm, for example, the direction t1→t2).

As described above, the ball may be detected, and the ball advancement direction in the trigger area may be confirmed in order to generate a trigger.

In the case in which a trigger is generated as the result of extracting the trigger area, determining whether the ball is detected, and investigating the ball advancement direction, as described above, the sensing-processor stores an image at the trigger generation time or a predetermined time after the trigger generation time as a reference image (i.e. a second reference image), as shown in FIG. 6 (S720).

Meanwhile, when the trigger is generated, as described above, the sensing-processor collects a predetermined number of images before the trigger generation time, after the trigger generation time, or before and after the trigger generation time from the buffer (S721), detects a ball from each of the collected images through a difference image using the reference image, and calculates the coordinates of the detected ball in a three-dimensional space (S722).

Subsequently, the sensing-processor calculates a ball motion model through a motion equation describing the ball motion using the calculated three-dimensional coordinate data of the balls (S723). That is, a motion equation of the ball that is pitched by the user and moves toward the screen in each of the x-axis direction, the y-axis direction, and the z-axis direction is accomplished based on the coordinate data of the ball in order to calculate a motion model of the ball motion.

For example, as shown in FIG. 9, a ball motion model, such as a ball motion model MD3, may be calculated using the coordinate data of t1 to t11.

Subsequently, the sensing-processor may calculate information about the position in the screen reached by the ball pitched by the user (a screen impact point) and the time at which the ball reaches the screen (a screen impact time) using the ball motion model, and may transmit the calculated information to the control device (S724).

The control device may realize an image simulating a ball moving from the screen impact point to the position of a virtual catcher based on the ball motion model using the screen impact point information and the screen impact time information, and may determine whether the ball pitched by the user is a strike or a ball based on the screen impact point information.

As described above, the sensing device and the sensing method used in the baseball practice apparatus, the baseball practice apparatus using the sensing device and the sensing method, and the method of controlling the baseball practice apparatus according to the present invention are capable of acquiring an image of the motion of a pitched ball or a hit ball and analyzing the acquired image in order to calculate an accurate and rapid motion model of the ball, which shows how the ball moves, whereby it is possible to very accurately and rapidly calculate various kinds of information necessary for conducting a baseball practice or a baseball game, such as motion parameters of the pitched ball or the hit ball.

INDUSTRIAL APPLICABILITY

The sensing device and the sensing method used in the baseball practice apparatus, the baseball practice apparatus using the sensing device and the sensing method, and the method of controlling the baseball practice apparatus according to the present invention are industrially applicable in a technical field that allows a user to perform baseball practice or play a virtual baseball game in such a manner that the user hits a ball pitched by the ball-pitching device with a bat in an indoor space of a predetermined size, and the sensing device senses hitting and realizes a simulation image on the screen in front of the user.

The invention claimed is:

1. A sensing device used in a baseball practice apparatus that allows a user to perform a baseball practice or to play a baseball game based on a virtual baseball image, the sensing device comprising:
   a camera device for successively capturing images of a moving ball; and
   a sensing-processor for extracting and analyzing a predetermined trigger area from each of the images captured by the camera device to generate a trigger for commencing a process of sensing the moving ball and performing the sensing process to calculate sensing information about the moving ball when the trigger is generated,
   wherein the sensing-processor is configured to extract and analyze the trigger area and determine whether a ball is detected in the trigger area,
   if a ball is detected in the trigger area, the sensing-processor determines whether a direction in which the moving ball advances is in a predetermined direction,
   if the ball advancement is in the predetermined direction, the sensing-processor generates the trigger for commencing a process of sensing the moving ball, and
   if the ball advancement is not in the predetermined direction, the sensing-processor does not generate the trigger.

2. The sensing device according to claim 1, wherein the sensing-processor is configured:
   to selectively execute a batter mode, in which a motion of at least one of a ball pitched by a ball-pitching device when the user hits the ball pitched by the ball-pitching device in a batting area or the hit ball when the pitched ball is hit is sensed, and a pitcher mode, in which a motion of a ball pitched by the user is sensed; and
   to determine whether to execute the batter mode or the pitcher mode according to a signal received from a control device of the baseball practice apparatus and to perform a process based on the determined mode.

3. A sensing method of a sensing device used in a baseball practice apparatus that allows a user to perform a baseball practice or to play a baseball game by hitting in a batting area a ball pitched by a ball-pitching device provided in the rear of a screen based on a virtual baseball image projected on the screen, the sensing method comprising:
   capturing images of a motion of the ball pitched by the ball-pitching device;
   extracting a trigger area of a predetermined size from a predetermined position in each of the captured images;
   analyzing an image of the extracted trigger area to generate a trigger for commencing a process of calculating a ball motion model of the moving ball; and
   extracting a ball from each of the images, calculating coordinates of the ball in a three-dimensional space, and calculating the ball motion model using the calculated coordinate data when the trigger is generated,
   wherein the step of analyzing an image of the extracted trigger area to generate a trigger comprises:
   determining whether a ball is detected in the extracted trigger area;
   analyzing the extracted trigger area to determine whether a ball advancement direction is a predetermined direction upon determining that the ball is detected in the trigger area;
   generating the trigger upon determining that the ball advancement direction is the direction in which the ball advances toward the batting area, and not generating the trigger if the ball advances not in the direction of the batting area.

4. The sensing method according to claim 3, wherein the step of calculating the ball motion model comprises:
   storing an image acquired at a predetermined time on a basis of a trigger generation time as a reference image;
   collecting a predetermined number of images before the trigger generation time, after the trigger generation time, or before and after the trigger generation time from the captured images;
   detecting a ball from each of the collected images using the reference image and calculating coordinate data of the detected ball in a three-dimensional space; and calculating a ball motion model of at least one of the ball pitched by the ball-pitching device or the ball hit by the user using the coordinate data of the ball.

5. The sensing method according to claim 3, wherein
the trigger area preset by the sensing device comprises a first trigger area located at one side of each of the images and a second trigger area located at the other side of each of the images, wherein the step of generating the trigger comprises generating the trigger when a ball is detected in the first trigger area and when a direction in which the ball advances is a first direction, in which the ball advances toward the batting area, and wherein the step of generating the trigger further comprises extracting the second trigger area by the sensing device when the trigger is generated and generating a trigger for commencing a process of calculating a ball motion model of the ball hit by the user when a ball is detected in the extracted second trigger area and when a direction in which the ball advances is a second direction, in which the ball advances toward an opposite side of the batting area.

6. A method of controlling a baseball practice apparatus that allows a user to perform a baseball practice or to play a baseball game based on a virtual baseball image, the method comprising:

realizing an image of a virtual pitcher pitching a ball by a control device for realizing an image for conducting the baseball practice or the baseball game;

performing control such that a ball-pitching device pitches a ball toward a batting area while being synchronized with the image of the virtual pitcher pitching the ball;

capturing images of a motion of the ball pitched by the ball-pitching device and extracting a trigger area of a predetermined size from a predetermined position in each of the captured images by a sensing device;

analyzing an image of the extracted trigger area to generate a trigger for commencing a process of sensing the moving ball by the sensing device;

performing the process of sensing the moving ball by the sensing device to calculate sensing information when the trigger is generated; and realizing a simulation image when the user hit the ball or an image for conducting the baseball practice or the baseball game when the user did not hit the ball based on the sensing information, received from the sensing device, by the control device, wherein the step of analyzing an image of the extracted trigger area to generate a trigger comprises:

determining whether a ball is detected in the extracted trigger area;

analyzing the extracted trigger area to determine whether a ball advancement direction is a predetermined direction upon determining that the ball is detected in the trigger area;

generating the trigger upon determining that the ball advancement direction is the direction in which the ball advances toward the batting area, and not generating the trigger if the ball advances not in the direction of the batting area.

* * * * *